United States Patent [19]

Heinz et al.

[11] 3,790,280

[45] Feb. 5, 1974

[54] SPATIAL FILTERING SYSTEM UTILIZING COMPENSATING ELEMENTS

[75] Inventors: Robert Alfred Heinz, Flemington Twp., Hunterdon County; Robert Charles Oehrle, Edgewater Park Twp., Burlington County, N.J.

[73] Assignee: Western Electric Company, Incorporated, New York, N.Y.

[22] Filed: May 3, 1972

[21] Appl. No.: 249,984

[52] U.S. Cl. .............. 356/71, 350/162 SF, 356/239

[51] Int. Cl. ....................... G01n 21/32, G02b 27/38

[58] Field of Search.. 350/162 SF, 3.5; 356/71, 168, 356/200, 237, 239; 250/219 CR, 219 DF

[56] References Cited

UNITED STATES PATENTS

| | | | |
|---|---|---|---|
| 3,414,875 | 12/1968 | Driver et al. | 350/162 SF |
| 3,630,596 | 12/1971 | Watkins | 350/162 SF |
| 3,658,420 | 4/1972 | Axelrod | 356/71 |
| 3,614,232 | 10/1971 | Mathisen | 356/71 |

OTHER PUBLICATIONS

Watkins, "Proc. of the IEEE," Vol. 57, No. 9, Sept. 1969, pp. 1634–1639

Lohmann et al., "Applied Optics," Vol. 7, No. 4, April 1968, pp. 651–655

*Primary Examiner*—David Schonberg
*Assistant Examiner*—Ronald J. Stern
*Attorney, Agent, or Firm*—B. W. Sheffield

[57] ABSTRACT

A spatial filtering system for inspecting integrated circuit photomasks, and the like. The system includes a spatial filter comprising a matrix-like array of opaque regions on a transparent field, as well as one pair of opaque compensating elements for each element edge orientation in the photomask to be inspected. The opaque regions block the d.c. and lower spatial frequencies of the periodic photomask feature information, while the compensating elements block the corresponding higher spatial frequencies (i.e., the edge information). Use of the system significantly improves the signal-to-noise ratio of the filtered image.

18 Claims, 15 Drawing Figures

SPATIAL FILTERING SYSTEM UTILIZING COMPENSATING ELEMENTS

BACKGROUND OF THE INVENTION

1. Field of the Invention

Broadly speaking, this invention relates to spatial filtering. More particularly, in a preferred embodiment, this invention relates to an improved spatial filtering system which inhibits transmission of substantially all periodic information in the filtered image, thereby significantly improving the signal-to-noise ratio of the system.

2. Discussion of the Prior Art

As is well known, in the manufacture of integrated circuits, and the like, wafers of silicon, or other semiconductor material, are coated with a layer of photoresist and, then, exposed to light through a special photographic plate, known in the industry as a photomask. The exposed photoresist is then developed, in the conventional manner, and unexposed areas of the photoresist are removed, thereby, exposing underlying portions of the silicon wafer. These exposed portions are then subjected to processing steps, such as diffusion, etching, and the like.

A typical IC photomask may comprise a matrix-like array of thousands of nominally identical photomask features, each in itself a complex pattern of lines and other geometric elements. Such photomasks have heretofore been made by successive photographic reductions from a large, hand-made master pattern, in a step-and-repeat camera, or more recently, by direct exposure of a photographic plate or chromium-coated plate in a computer-controlled electron beam machine. More recently still, a primary pattern generator (PPG), a computer-controlled electro-mechanical laser deflection system, has been successfully employed to manufacture IC photomasks [See *Bell System Technical Journal*, (November 1970), Vol. 49, No. 9, pages 2031–2076].

However, regardless of the manufacturing process employed, IC photomasks are expensive and time consuming to make. Accordingly, every effort is made to prolong their useful life. Because of the extremely high resolution required with modern IC devices, exposure of photoresist-covered silicon wafers can only be satisfactorily accomplished by a contact-printing process in which the emulsion side of the photomask is placed in direct physical contact with the wafer. This frequently results in damage to the mask during exposure. Furthermore, pinhole defects may occur during manufacture of the photomask itself, and dust or dirt may settle on the mask during use.

These defects are, of course, very serious, for any wafer exposed to light through a damaged or dirty photomask may yield dozens of defective, or wholly inoperative, IC devices. This situation is further aggravated by the fact that the same photomask is used over and over again. Thus, a given defect on a mask might be responsible for thousands of defective IC devices, a most undesirable situation.

As previously discussed, IC photomasks are too expensive to be discarded after they have been used only a few times. Accordingly, it becomes necessary to carefully inspect each mask after manufacture and also, somewhat less critically, during actual production. Heretofore, this inspection was done manually by a skilled human operator, with the aid of a microscope. However, because of the complex nature of the geometric pattern in each photomask feature, as well as the fact that each mask contains many thousands of identical features, human error and fatigue often result in failure to detect significant numbers of defects.

To overcome this problem, a spatial filtering technique was developed to inspect the photomasks. This technique forms the subject matter of copending U. S. patent application, Ser. No. 858,002, filed Sept. 15, 1969, (Watkins Case 1), which application is assigned to the assignee of the instant invention.

As disclosed in said copending application, the photomask to be inspected is illuminated by spatially coherent radiation from a laser and positioned proximate the front-focal plane of a convex lens. In accordance with well-known optical principles, an image will be formed at the rear-focal plane of the lens which corresponds to the Fourier transform of the photomask. That is to say, the image is a composite diffraction pattern whose spatial distribution is the optical product of two components: (1) the interference function of the photomask, comprising a distribution of bright dots of light whose spacing is inversely proportional to the spacing between adjacent features in the mask; and (2) the diffraction pattern of a single feature. Now, as disclosed in said copending application, if a spatial filter comprising an array of opaque regions on a transparent field, is positioned proximate the back-focal plane of the lens, and if the spacing between the opaque regions corresponds exactly to the spacing between the dots of light in the diffraction pattern, substantially all of the light energy from the laser will be blocked, and of course, this blocked light primarily carries the periodic information.

However, if the mask is defective in some way, for example, if the mask is scratched, etc., the Fourier transform of the defect will not spatially correspond to the pattern of opaque regions on the filter, and accordingly, some light will succeed in passing through the filter, thereby enabling the scratch or other defect to be easily detected.

The above-described spatial filtering technique has been highly successful in practice. However, certail problems were encountered when an attempt was made to automate the inspection process. For example, in order to eliminate the human factor, a television camera, coupled to a counting device, was positioned to view the filtered image of the mask. As this camera scanned over the image, the counting device recorded the number of defects detected and/or the total defective mask area, and, if the value so found exceeded some predetermined value, the mask was discarded, or set aside for possible repair.

The system disclosed in copending application, Ser. No. 858,002, assumed, for the sake of simplicity, that the interference function produced by a lens comprises equally spaced dots. In practice this is not exactly so, and the lens generates an interference function in which the dots become progressively further apart by very small increments. Furthermore, the lens may suffer from one or more optical aberrations, such as coma, astigmatism, field curvature, and distortion. The net effect is that, as the light energy impinges on those parts of the filter which lie further and further away from the center thereof, the opaque regions thereon no longer fully block the light which is coming from the photomask, even in the total absence of defects on the mask. This is so for two reasons: first, the outermost regions are improperly positioned to fully intercept the light from the photomask, even if it were properly focused on the regions. Secondly, because the opaque regions are physically located on a planar surface, the outermost opaque regions lie a small distance apart from the true focus of the lens, and hence, in effect, become too small to fully block the light from the photomask. The outermost regions, of course, are intended to intercept the higher spatial frequencies from the photomask and, in practice, the only features on the mask possessing such higher spatial frequencies are the edges of the photomask features.

In prior art systems, where the filtered image was inspected by a human operator, this failure to fully suppress periodic high-frequency edge information did not prove to be a significant problem. In fact, it was something of an advantage, because the outline of the individual photomask features could be seen very faintly in the background. Thus, the location of non-periodic defects which were successfully isolated by the system could be rapidly ascertained. However, in an automated process, this no longer holds true, because a television camera does not have a human operator's ability to reason and is unable to discriminate between a true defect and the high-frequency edge information of the photomask features. Thus, in the automated process the edge information was erroneously counted as a defect, which it is not. An additional problem with the prior art approach, is that because of the presence of high frequency edge information only a few of the thousands of features on a mask can be inspected at the same time. Now, if an attempt is made to increase the field of view, that is to say, if instead of inspecting only twenty or so of the thousands of features on a given mask, it is desired to simultaneously examine several hundred features, the spatial filter must, accordingly, be made with considerably more accuracy.

As one solution to this problem, copending application, R. A. Heinz, et al., Ser. No. 249,983 of even date, discloses a spatial filtering system wherein the region-to-region spacing on the filter increases, outwardly from the center of the mask, according to a precise mathematical formula. The system disclosed in the aforesaid copending application has been highly successful in practice. However, the exacting requirements for the placement of the individual regions on the mask are such that it can only be satisfactorily made by the use of a computer-controlled device, such as the PPG or a computer-controlled electron-beam machine. This, in turn, increases the cost of the filter and makes the manufacture thereof very time consuming.

For less exacting requirements, copending application, R. A. Heinz, et al., Ser. No. 249,985, also of even date, discloses a spatial-filtering technique wherein the filter employs a uniform region-to-region spacing which is greater than that disclosed in copending application Ser. No. 858,002, (Watkins Case 1), but wherein the location of some regions nearly coincide with the location of corresponding regions in the filter disclosed in copending application, R. A. Heinz, et al., Ser. No. 249,983. Thus, although not quite as effective at blocking the higher spatial frequencies as the filter having non-linear region-to-region spacing, the filter disclosed in copending application, R. A. Heinz, et al., Ser. No. 249,985 is nevertheless, approximately twice as effective as the filter disclosed in copending application Ser. No. 858,002 (Watkins Case 1).

As previously noted, however, regardless of which of the above filters is used, the filter regions towards the extremities of the filter begain to fail to block much of the high frequency information, due to the fact that they are on a planar surface (i.e., the photographic plate) rather than on the focal plane of the lens. Thus, the edges of the photomask features may still be visible on the display device, or TV monitor. For some applications, this has proved to be most undesirable. Merely making all the blocking regions larger will not solve the problem, for although the larger regions will block the periodic information (noise) more efficiently, they will also attenuate the defect signals to a greater extent. Thus, there tends to be no overall improvement in the signal-to-noise ratio.

SUMMARY OF THE INVENTION

Accordingly, as a solution to the above problems, it is an object of this invention to provide a method of spatially filtering an image which suppresses substantially all periodic information in the image, including high-frequency edge information present in the Fourier transform of the image, yet which permits use of a spatial filter having uniform region-to-region spacing thereon.

It is a further object of this invention to provide a novel construction of a spatial filter for practicing the above method.

To attain these, and other objects, a first embodiment of the invention comprises a method of isolating non-periodic errors in a matrix-like array of nominally identical features, each feature comprising a pattern of lines and other polygonal elements, said features being mutually spaced apart along at least one axis by a predetermined distance. The method comprises the steps of first directing a spatially coherent beam of light at the pattern to diffract the light; and then focusing the diffracted light on a filter containing a plurality of discrete opaque regions on a transparent field, and at least one pair of opaque compensating regions for each element edge orientation located symmetrically about the center of the filter, on an axis orthogonal to the corresponding element edge, the spacing of said opaque regions, along at least one axis of the filter being uniform and defined by the equation:

$$x = n\lambda f/d$$

where, $x$ = the distance of the $n^{th}$ region from the origin;
$\lambda$ = the wavelength of the light forming said image;
$n$ = the order of the spatial harmonic;
$f$ = the focal length of the image-forming lens;
$d$ = the step-and-repeat of the workpiece, to spatially modulate the light. Next, the spatially modulated light is reimaged to form an image exhibiting the non-periodic errors in the pattern, the discrete regions in the filter blocking essentially all periodic information in the image, and said at least one pair of compensating elements blocking the higher spatial frequencies corresponding to the edge information of the polygonal elements of the feature pattern.

For practicing the above method, another embodiment of the invention comprises a spatial filter including a matrix-like array of opaque regions on a transparent field, said regions inhibiting further transmission of substantially all periodic information in said transform. The filter further includes at least one pair of opaque compensating regions for each element edge orientation, located symmetrically about the center of the filter, on an axis orthogonal to the corresponding feature edge, to inhibit further transmission of the higher spatial frequencies corresponding to the edge information of the polygonal elements of the feature pattern.

In a still further embodiment of the invention, the region-to-region spacing in said array, along at least one axis thereof, is greater than or equal to the spacing dictated by the equation:

$$x = n\lambda f/d$$

where, $x$ = the distance of the $n^{th}$ region from the origin;

$\lambda$ = the wavelength of the light forming said image;

$n$ = the order of the spatial harmonic;

$d$ = the step-and-repeat of the workpiece.

$f$ = the focal length of the image-forming lens.

The invention, and its mode of operation will be more fully understood from the following detailed description, and the following drawing, in which:

DETAILED DESCRIPTION OF THE INVENTION

Figure 1:
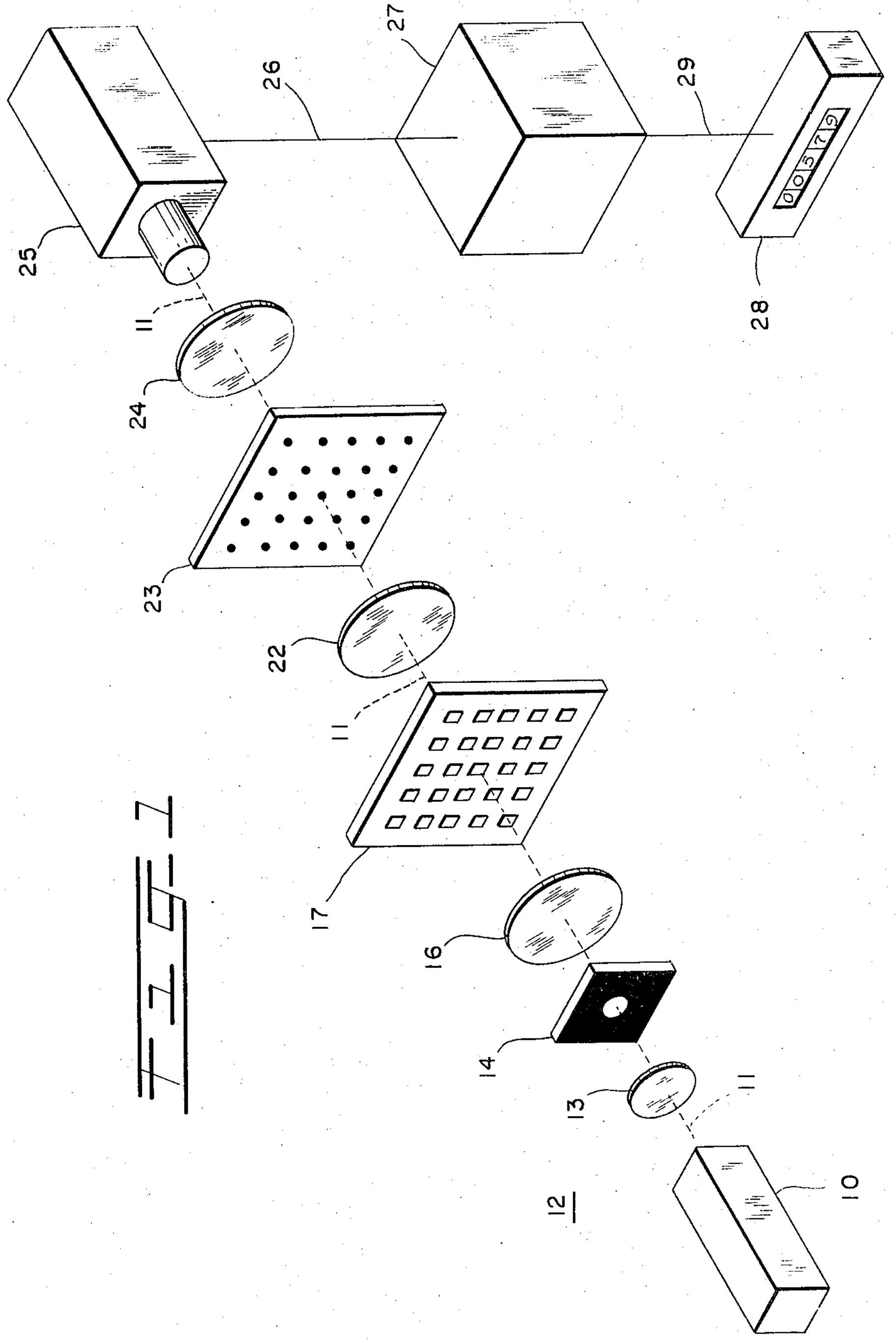
FIG. 1 is a partially schematic, isometric view of a first embodiment of the invention.

FIG. 1 depicts an illustrative embodiment of the invention. As shown, the apparatus comprises a laser 10 which, when connected to a suitable source of energy (not shown), emits a beam of spatially coherent radiant energy along a longitudinal axis 11. The light from laser 10 is directed through a beam expander 12 comprising a first lens 13 and pinhole 14. The expanded beam is then passed through a collimating lens 16 and finally falls upon the IC photomask 17 to be inspected.

Figure 2:
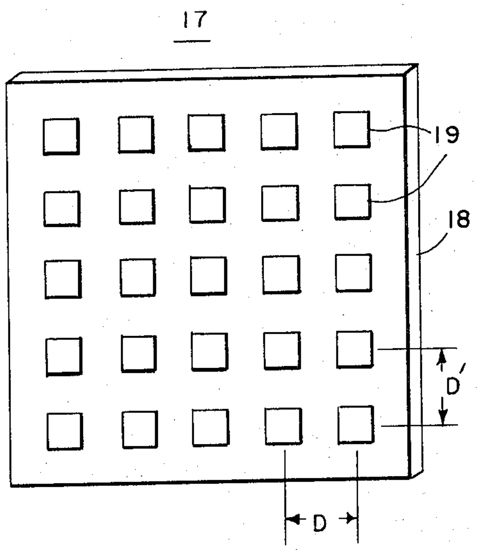
FIG. 2 illustrates a typical workpiece of the type to be inspected by the instant invention.
Figure 3:
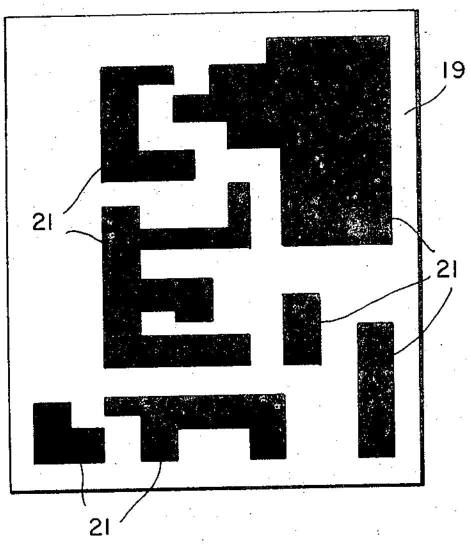
FIG. 3 shows an enlarged view of a portion of the workpiece shown in FIG. 2.

FIGS. 2 and 3 illustrate photomask 17 in greater detail. As shown, the photomask comprises a glass photographic plate 18 having recorded thereon a matrix-like array of nominally identical features 19. As shown in FIG. 3, each feature comprises a complex pattern of opaque areas 21 on a transparent field, the pattern in each feature defining the areas of the photoresist-covered semiconductor wafer which is to be protected from exposure to the light. It will be noted that all of the edges of the areas 21 in feature 19 are parallel to either the horizontal or to the vertical axes of the mask, and this is typical for the vast majority of IC devices currently made. By analogy to the orientation of the blocks in a typical city, such a configuration is frequently referred to as "Manhattan" geometry, and the invention disclosed herein is particularly advantageous for inspecting workpieces exhibiting such geometry. It must be stressed, however, that the invention is not so limited and can, in fact, be used to inspect any workpiece having features whose element edges are oriented in a small and finite number of directions. For example, the features of the workpiece could contain triangular, hexagonal, paralleloidal, etc. elements. However, the technique of this invention offers no advantage over previous techniques for inspecting features such as circles, ellipses, etc.

It will also be noted that, in FIG. 2, a uniform spacing D is assumed to exist between the center lines of each feature on the mask. It is further assumed that this spacing is the same in both the horizontal and vertical directions (i.e., $D = D'$). Occasionally, a photomask is produced in which the feature-to-feature spacing differs in the horizontal and vertical directions. However, this is easily compensated for in the design of the spatial filter, and the underlying theory of the instant invention applies to both arrangements.

In the drawing, mask 17 is depicted as having a 5 × 5 matrix of features thereon. One skilled in the art will appreciate that this is merely for convenience in preparing the drawings and that an actual photomask may have as many as 40,000 features thereon arranged in a 200 × 200 matrix.

Returning now to FIG. 1, photomask 17 is positioned at the front-focal plane of a second lens 22 which, as previously discussed, will form a Fourier transform of the photomask at the back-focal plane thereof. In accordance with the teachings of copending application, Ser. No. 858,002, (Watkins Case 1) a spatial filter 23 is positioned at the back-focal plane to intercept all periodic information from photomask 17 and to permit all non-periodic information, such as defects in the photomask, to pass through the filter with minimum attenuation and distortion. The non-periodic information which does succeed in passing through filter 23 is imaged by a third lens 24 for viewing by a television camera 25. As will be explained below, camera 25 is connected by a lead 26 to a control circuit 27 which includes conventional power supplies, amplifiers, deflection apparatus, etc. A digital readout device 28 is connected to control circuit 27 by a lead 29 to record the number of defects (and/or the defective area) in photomask 17 which succeed in passing through spatial filter 23 and are detected by camera 25.

Figure 4:
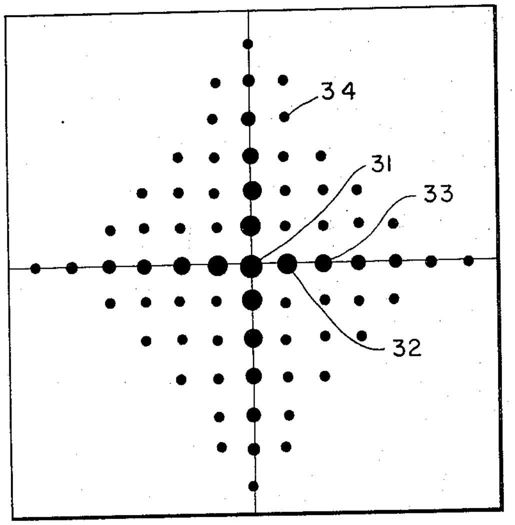
FIG. 4 depicts the format of the diffraction pattern produced when the workpiece of FIG. 2 is inspected by the apparatus of FIG. 1.

FIG. 4 illustrates the pattern which would be seen if a screen were to be positioned at the back-focal plane of lens 22, rather than spatial filter 23. For convenience in drawing, this pattern is shown as a series of black dots on a white field. It will be appreciated that, in actual practice, each of the black dots in FIG. 4 represents a spot of bright light. As seen, the pattern approximates a cross with the spacing between adjacent light dots in the horizontal direction being inversely proportional to the feature-to-feature spacing in the horizontal direction in mask 17, and the spacing between adjacent dots in the vertical direction being inversely proportional to the feature-to-feature spacing in photomask 17 in the vertical direction. If, as discussed, the feature-to-feature spacing on the mask is uniform, and equal, in both directions, then under the assumptions made in the referenced copending application (Watkins Case 1), the dot-to-dot spacing in the diffraction pattern will also be uniform, and equal, in both directions. The large central dot 31 corresponds to the d.c. term of the Fourier transform and, moving to the right, in the horizontal direction, dot 32 corresponds to the "first" harmonic, or fundamental spatial frequency (i.e., the step-and-repeat pattern of the mask), dot 33 the second harmonic, and so on.

Figure 5:
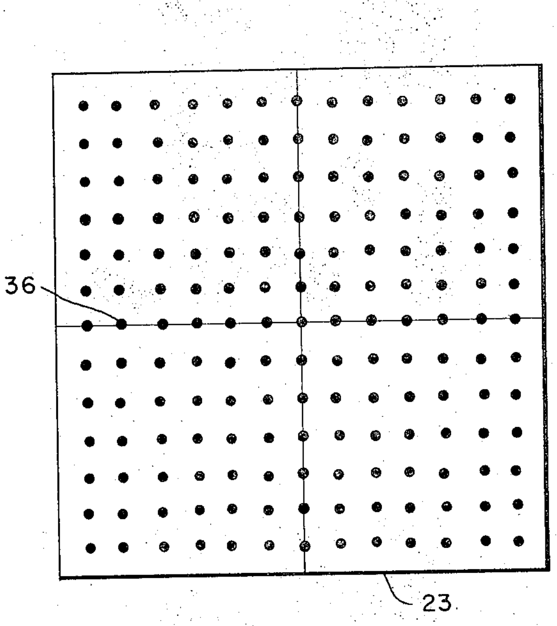
FIG. 5 depicts an illustrative prior art spatial filter.

FIG. 5 depicts a spatial filter of the type disclosed in the above-referenced copending application, Ser. No. 858,002, (L. S. Watkins Case 1). This filter comprises an array of opaque regions on a transparent field. This type of filter can be manufactured by the use of any of several techniques in essentially the same manner that the photomask itself may be manufactured. Considerable success has been obtained by the use of the primary pattern generator, and a step-and-repeat camera. If, as is usually the case, the feature-to-feature spacing on the mask is uniform, and equal, along both the horizontal and vertical axes, then the array of opaque regions in the spatial filter will also be uniform, and will coincide approximately with the location of light spots 31 through 34, etc., in FIG. 4.

While the intensity and size of the light dots in the actual diffraction pattern of FIG. 4 may vary, the opaque regions in FIG. 5 are all uniform in size and density. Of course, the regions must be large enough to block the largest of the light dots shown in FIG. 4.

Figure 6:
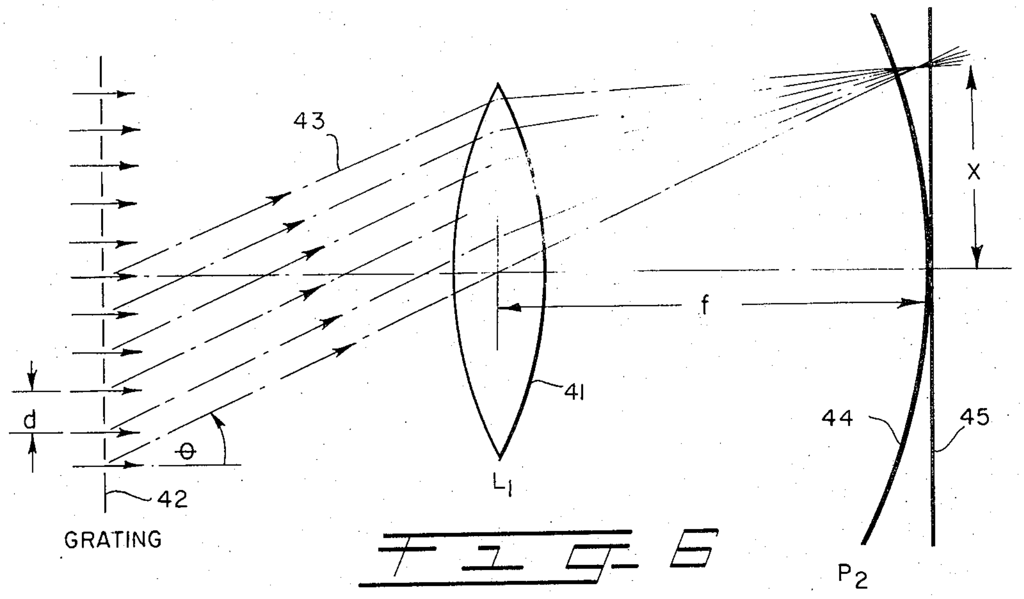
FIG. 6 is a diagram illustrating the theory underlying the instant invention.

As previously discussed, the system described in copending application, Ser. No. 858,002, (Watkins Case 1) assumed that the lens was perfect and produced equally spaced dots. However, for more critical applications, this assumption is not valid and the deviations must be taken into account. In FIG. 6 a lens 41 is shown positioned so that a diffraction grating 42 is at its front-focal plane. The diffraction grating has elements spaced apart by a uniform distance d. Typical light rays 43 are shown coming from the diffraction grating at an angle $\theta$ to the horizontal axis, as shown, and are imaged by lens 41 onto the back-focal plane of lens 41. From basic diffraction theory, it is known that when a plane, collimated beam of light is incident upon an intensity grating, the resulting pattern behind the grating is the superposition of many plane waves, each propagating in a different direction. The angle $\theta$ at which these beams emanate from the grating is a function of the harmonic, which they represent, that is:

$$\sin \theta = n\lambda/d \qquad (1)$$

where, $\lambda$ = the wavelength of light;

$n$ = the order of the harmonic;

$d$ = the step-and-repeat of the array.

As seen in FIG. 6, each of these waves is then focused to a spot in the back-focal plane 44 by the Fourier transforming lens 41. The location of the light spots on the planar surface 45 can be computed from simple geometry:

$$x = f \tan\theta = f \tan [\sin^{-1} (n\lambda/d)] \qquad (2)$$

Since for small angles, i.e., low spatial frequencies, $\sin \theta \cong \tan \theta \cong \theta$, the above equation reduces to the form which was assumed in the above-referenced copending application, namely, $$x = n\,\lambda f/d \qquad (3)$$

Figure 7:
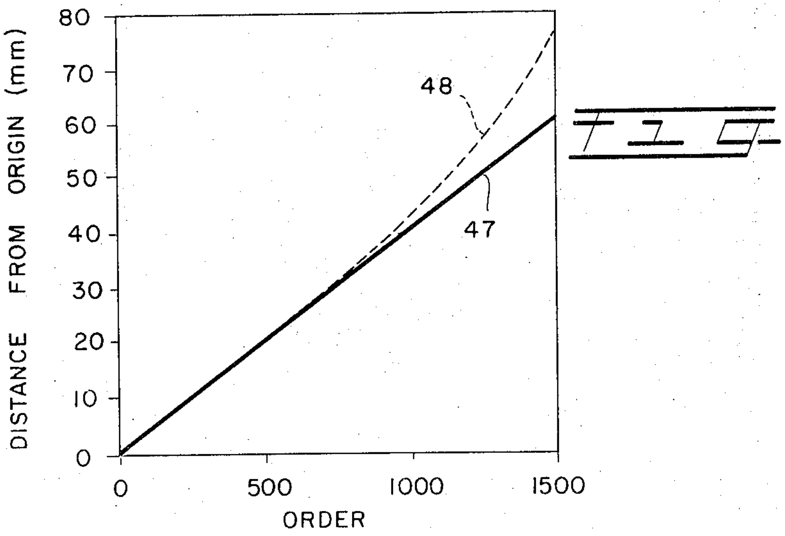
FIG. 7 is a graph showing the spacing of filtering regions on the filter of FIG. 5, as a function of the spatial harmonic.

FIG. 7 is a graph showing the distance from the origin (center) of the opaque filter regions, as a function of the order of the spatial frequency, for the linear equation assumed in copending application, Ser. No. 858,002, and for the actual equation given in Equation 2 above. It will be observed that for the first few orders, the deviation between the linear graph and the actual, approximately tangential graph is very small, but toward the higher orders, this discrepancy becomes increasingly larger.

Figure 8:
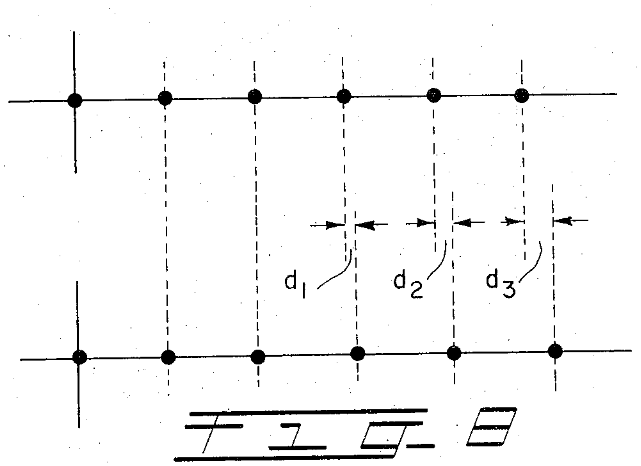
FIG. 8 depicts the relative orientation of the filtering regions of a prior art filter.

The upper half of FIG. 8 depicts the uniform region-to-region spacing employed in prior art spatial filters, corresponding to the linear graph 47 in FIG. 7. Copending application R. A. Heinz, et al., Ser. No. 249,983 even date, discloses the use of a spatial filter in which the region-to-region spacing is not uniform but, rather, increases according to curve 48 in FIG. 7. Thus, as shown in the lower half of FIG. 8, while the first few regions in the filter disclosed in said copending application are at approximately the same position as they would be for the linear case, if one moves outward, to the right, from the center of the filter, the discrepancy between the position of the regions in the linear filter and those in the non-linear filter of said copending application becomes increasingly large. Again, it must be emphasized that for clarity, the scale has been greatly exaggerated.

Because the step-and-repeat spacing of typical integrated circuit devices varies from 20 to 120 mils, the typical spacing between the opaque regions on a spatial filter varies from 20 to 120 microns. It is, therefore, essential that the filter be manufactured with the greatest care, and considerable accuracy is required to successively increase the distance between the regions, in accordance with Equation 2. Accordingly, if the spatial filter disclosed in copending application, R. A. Heinz, et al., Ser. No. 249,983, of even date, constructed in accordance with Equation 2 and graph 48 of FIG. 7, is substituted for the spatial filter 23 in FIG. 1, the filter will effectively block all repetitive information from the photomask 17, including a substantial portion of the edge information, even though the regions are actually positioned on planar surface 45, rather than the actual back-focal plane of lens 22.

From a practical standpoint, the requirements for manufacturing the filter described in copending application, R. A. Heinz, et al., Ser. No. 249,983, are so demanding, particularly the progressive, but minute, increase in region-to-region spacing, that production can only be satisfactorily accomplished by the use of a computer-controlled device such as the PPG or an electron-beam machine. This, of course, makes the filter relatively expensive and time consuming to produce. Accordingly, as disclosed in copending application, R. A. Heinz, et al., Ser. No. 249,985, of even date, for less critical applications, where a certain degree of extraneous high-frequency edge information can be tolerated, a different filter structure, having a uniform region-to-region spacing can be substituted for the filter used in the application, R. A. Heinz, et al., Ser. No. 249,983, of even date.

Figure 9:
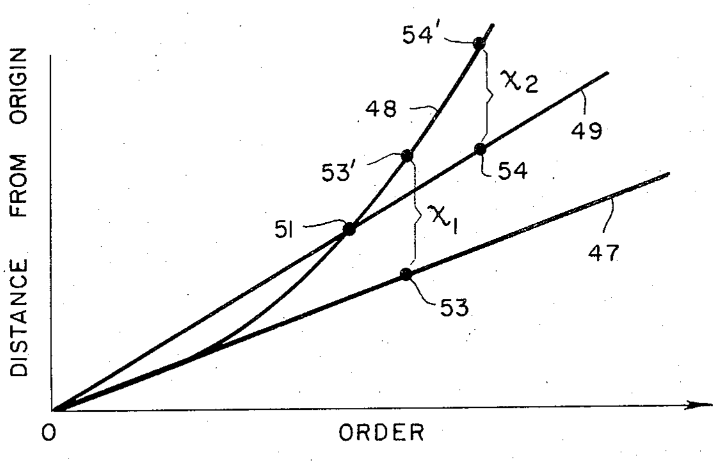
FIG. 9 is a graph showing the spacing of some of the opaque regions of the filter disclosed in copending application R. A. Heinz et al. Case 2–5, of even date.

As shown in FIG. 9, the filter in the aforesaid copending application is based on the fact that if a line 49 is drawn having a slope slightly steeper than that of line 47, which latter line corresponds to the linear Equation 3 above, the line will intersect the actual curve at the origin and at the point 51. Thus, if a spatial filter is constructed having a uniform region-to-region spacing defined by line 49, rather than line 47 or 48, the opaque filter regions lying to the left of point 51 will be located further from the origin than the theoretical location would dictate, the regions which are clustered about point 51 will be positioned extremely close to the theoretically defined positions, and the regions to the right of 51 will be located closer to the origin, than the theoretical location would dictate.

Now, if the opaque regions on the filter are somewhat larger than the spots of light in the diffraction pattern of the workpiece to be examined, the filter regions to the left of point 51 will, nevertheless, intercept the periodic information in the diffraction pattern.

Assume that the point 53 on graph 47 corresponds to the position of that opaque region on filter 23, which no longer satisfactorily intercepts diffracted light from the mask 17. The vertical distance from this point to the corresponding point 53′ on graph 48 represents the deviation $x_1$ between the actual position of this opaque region and the position that this same order region would have occupied had the region-to-region spacing on the filter been steadily increased, according to graph 48 and Equation 2. In a similar manner, point 54 on graph 49 represents the location of the last opaque region to satisfactorily block diffracted light from pattern 17 in a filter constructed according to the teachings of copending application, R. A. Heinz et al. Ser. No. 249,985, of even date. Again $x_2$ represents the deviation between the true position of this region and the position that it would have occupied had the region-to-region spacing been steadily increased according to Equation 2. It will be observed that for the same deviation, i.e., when $x_1 = x_2$, the location 54 of the last satisfactory opaque region on a filter according to the above-referenced invention, lies much further to the right than the location 53 on a filter constructed according to the prior art teachings. In other words, even though the region-to-region spacing on the instant filter is uniform, and deviates from the optimum or theoretical spacing, the results obtained by the use of this filter will, nevertheless, be significantly superior to those obtained by the use of the filters disclosed in the above discussed copending application (Watkins Case 1). The reason for this is that a larger percentage of the opaque filter regions are positioned to effectively block the periodic information, and hence, to suppress high-frequency edge information. This is illustrated in more detail in FIG. 10 in which a plurality of opaque filter regions 36 are drawn in alignment with the graph of FIG. 9. The black dots within each such filter region are intended to represent the bright spots of light generated by the Fourier transform of photomask 17. As can be seen from the figure, the center opaque filter region is positioned to intercept the dot of light corresponding to the d.c. term squarely in the center thereof. This is no surprise because graphs 48 and 49 coincide at the origin (d.c. term). However, as the order increases, in a direction to the right in FIG. 10, the spots of light are intercepted by the corresponding filter regions more and more to the left of center until at the fourth filter region shown, the light spot almost fails to be intercepted. Continuing on, however, for higher and higher orders, the light spot begins to move to the right until, at the filter region corresponding to point 51 on the graph (i.e., at the intersection of graphs 48 and 49), the light region is once more squarely centered in the filter region. Continuing on to still higher orders, the point of interception moves to the right until, as shown, in the last filter region, the light dot completely fails to be intercepted and from then on, the filter will fail to suppress high-frequency edge information until the light dot again gets in "synchronism" with the opaque filter regions.

Figure 10:
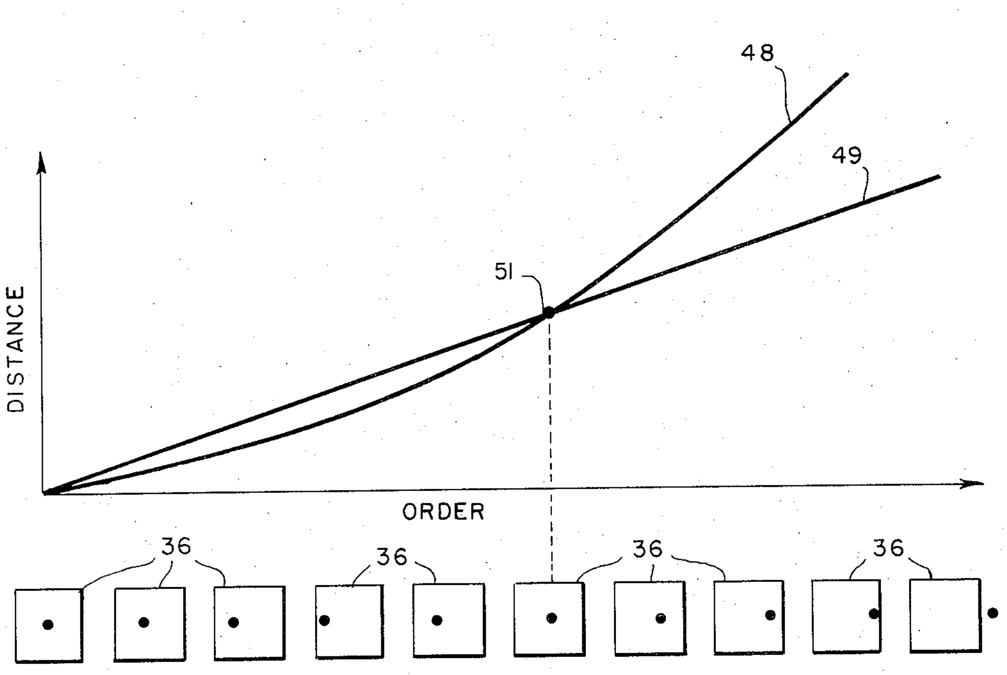
FIG. 10 is a diagram illustrating the underlying theory of operation of the filter of FIG. 9.
Figure 11:
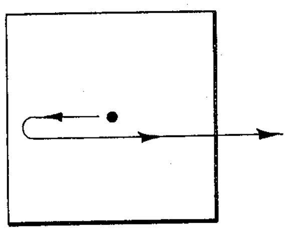
FIG. 11 is a diagram illustrating the operation of the above filter in greater detail.

The apparent movement of the light dot with respect to the filter regions is shown in FIG. 11. As will be self-evident, the dot appears to move from the center of the opaque region to the extreme left and, then, reverses direction and moves to the right passing once more through the exact center of the opaque filter region. It will be appreciated that FIGS. 9 and 10 are not to scale and are merely illustrative of the operation of the invention. The motion of the light spots shown in FIGS. 9 and 10 actually occurs over several hundred opaque filter regions, rather than the dozen or so shown.

Theoretically, by the use of the filter disclosed in copending application R. A. Heinz, et al., Ser. No. 249,985, nearly twice as many light spots can be successfully intercepted then can be intercepted by the linear prior art filter disclosed in copending application, Ser. No. 858,002, (L. S. Watkins Case 1) that is to say, in a typical filter approximately 200 or more light dots.

Figure 12:
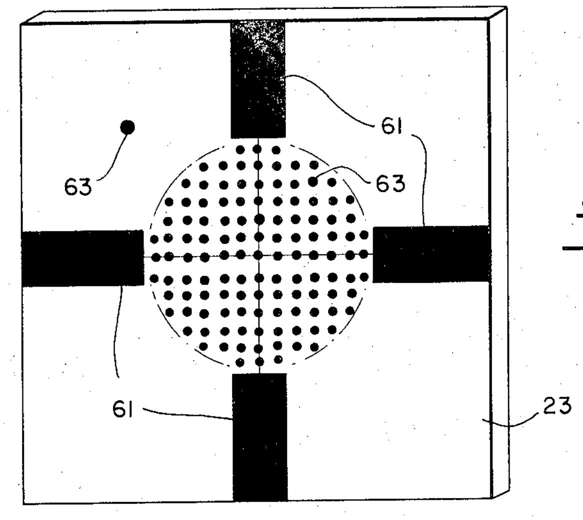
FIG. 12 depicts the complete filter according to this invention, including the wedge-compensator regions.

However, as previously discussed even that small percentage of edge information which succeeds in passing through the spatial filter may, nevertheless, prove extremely troublesome for some applications. It has previously been noted that the instant invention is not at all limited to inspecting workpieces having features with exclusively "Manhattan" geometry. However, from a practical standpoint, the vast majority of integrated circuit photomasks to be inspected do, in fact, contain only "Manhattan" geometry. Thus, the edge information present in the Fourier transform will lie in the filter plane only along the x and y axes of the filter. Accordingly, as shown in FIG. 12, by positioning a plurality of opaque compensating wedges or regions 61 at the extremities of the x and y axes of the filter, the edge information in the Fourier transform will be completely blocked while the opaque regions in the center of the filter will block all low-frequency periodic information from the transform.

Since it is most unlikely that dust particles, dirt, scratches, pinhole defects, and the like, will (1) have a square or rectangular configuration, and (2) be oriented parallel to the x and y axes, the spatial-frequency pattern that these defects will produce will be imaged primarily in areas of the filter other than those portions blocked by the compensating regions 61, for example, at location 63, and thus, these defects will pass through the filter to be detected by TV camera 25. With a filter constructed as shown in FIG. 12, there is some slight chance that an exceedingly small defect, for example, a missing portion of one of the features of an integrated photomask, which does have "Manhattan" geometry, and which thus, lies parallel to the *x* and *y* axes, will have a large percentage of its information imaged in the compensating regions. Such defects are rare, but do, in fact, occur. However, if the center region of the filter (between the wedge compensators) is carefully chosen, sufficient low-frequency information from such a defect will, nevertheless, be transmitted to permit detection of the defect.

Compensators 61 may, of course, be employed with the linear-spatial filters disclosed in copending applications, Ser. No. 858,002, and R. A. Heinz, et al. Ser. No. 249,985, of even date, as well as the non-linear filter disclosed in copending application, R. A. Heinz, et al. Ser. No. 249,983, of even date. Furthermore, the shape of the compensators is not critical and need not be rectangular, as shown and could comprise, for example, a circle, square, triangle, etc. In FIG. 12 the matrix-like array of opaque dots is depicted as having a generally circular configuration in the central portion of the filter. Of course, these opaque regions could extend over the entire surface of the filter, but this is not generally necessary, as virtually all light dots of significant intensity lie along either the *x* and *y* axes, or near the central portion of the filter. Accordingly, extending the opaque regions to the corners of the filter is, in general, unnecessary.

Figure 13:
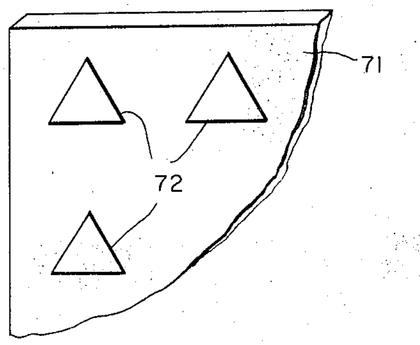
FIG. 13 depicts another type of workpiece which may be inspected by the instant invention.

As previously discussed, it is entirely possible, though unlikely, that the features on the photomask, or other workpiece, to be inspected do not possess "Manhattan" geometry. For example, FIG. 13 depicts a portion of a mask 71 having a plurality of triangularly shaped features 72 thereon.

It will be noted that each feature 72 has only three edges, and each edge is oriented in a unique direction. Thus, the requirement that the element edges of each feature in the array be oriented in a small number of directions is fully met. Accordingly, mask 71 may be satisfactorily inspected by a spatial filter according to this invention.

Figure 14A:
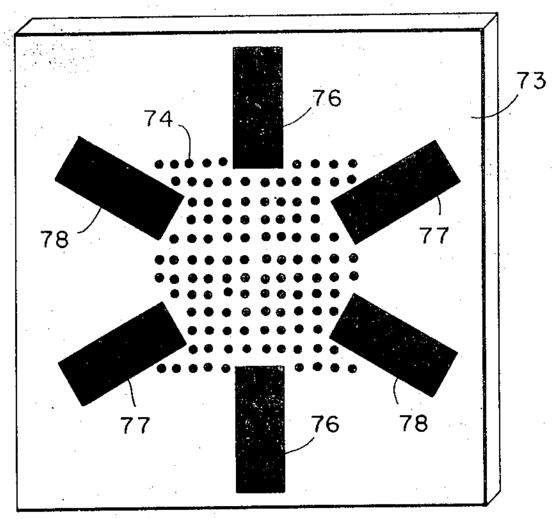
FIG. 14*a* depicts a filter for use with the workpiece shown in FIG. 13, which includes wedge-compensator regions which are positioned differently from those shown in FIG. 12.
Figure 14B:
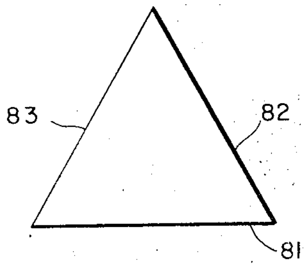
FIG. 14*b* illustrates the edge orientation of the features shown in FIG. 13.

FIG. 14*a* depicts such a filter. As shown, filter 73 comprises a matrix-like array of opaque regions 74 on a transparent field. A plurality of compensating elements 76, 77 and 78 are disposed about the outer edges of the filter. However, unlike the filter shown in FIG. 12, the compensating elements are not positioned along the principle axes of the filter. Rather, elements 76, 77 and 78 are positioned to suppress the edge information generated by the edges 81, 82, and 83, respectively, of each feature 72 on the mask, which edges are shown more clearly in FIG. 14*b*.

One skilled in the art will appreciate that while the invention has been described with reference to the inspection of integrated circuit photomasks, it may also be used to inspect any workpiece having optical characteristics approximating those of an optical grating, either transmissive or reflected, e.g., a processed silicon semiconductor slice. For example, the invention has successfully been used to inspect fine metallic grids, and diode array targets, such as those used in the manufacture of Picturephone camera tubes, and the like. It must again be stressed that an analog exists for all of the above-described spatial filters. That is to say, by changing the filter to an array of transparent regions and wedges on an opaque field, the passage of periodic information is assured, while passage of non-periodic information may be blocked. Also, the term "regions," as used herein to describe the opaque (or transparent) regions on the filter, is intended to comprise various shapes, such as circles, squares, triangles, etc. The actual shape employed is merely a matter of convenience, provided that the corresponding light dot in the diffraction pattern is blocked (or passed). Also, various changes and substitutions may be made to the elements shown, without departing from the spirit and scope of the invention.

Finally, it must again be stressed, that while "Manhattan" geometry is by far the most common found in integrated circuits, the methods and apparatus of this invention may be used to inspect workpieces having features comprising a pattern of lines and other polygonal elements.

What is claimed is:

1. A method of isolating non-periodic errors in a matrix-like array of nominally identical features, each feature comprising a pattern of lines and other polygonal elements, said features being mutually spaced apart by a predetermined distance, along at least one axis, which comprises the steps of:

directing a spatially coherent beam of light at the pattern to diffract the light;

focusing the diffracted light on a filter consisting of a matrix-like array of discrete substantially equally sized opaque regions on a transparent field, and at least one pair of opaque compensating regions for each element edge orientation located symmetrically about and spaced from the center of the filter, on an axis orthogonal to the corresponding element edge, such that a substantial number of said substantially equally sized opaque regions are disposed between the individual regions of each pair of compensating regions the spacing of said substantially equally sized opaque regions, along at least one axis of the filter being uniform and defined by the equation:

$$x = n\lambda f/d$$

where, $x$ = the distance of the $n^{th}$ region from the origin, $\lambda$ = the wavelength of the light forming said image, $n$ = the order of the spatial harmonic, $f$ = the focal length of the Fourier-transform lens, $d$ = the step-and-repeat distance of the workpiece, to spatially modulate the light; and then reimaging the spatially modulated light to form an image exhibiting the non-periodic errors in the pattern, the periodic information in said image, and said at least one pair of compensating regions blocking the higher spatial frequencies corresponding to the edge information of the polygonal elements of the feature pattern.

2. A method of isolating non-periodic errors in a matrix-like array of nominally identical features, each feature comprising a pattern of lines and other polygonal elements, said features being mutually spaced apart by a predetermined distance, along at least one axis, which comprises the steps of:

directing a spatially coherent beam of light at the pattern to diffract the light;

focusing the diffracted light on a filter consisting of a matrix-like array of discrete substantially equally sized opaque regions on a transparent field, and at least one pair of opaque compensating regions for each element edge orientation located symmetrically about and spaced from the center of the filter, on an axis orthogonal to the corresponding element edge, such that a substantial number of said substantially equally sized opaque regions are disposed between the individual regions of each pair of compensating regions the spacing of said substantially equally sized opaque regions, along at least one axis of the filter being uniform and greater than the spacing dictated by the equation:

$$x = n\lambda f/d$$

where, $x$ = the distance of the $n^{th}$ region from the origin,
$\lambda$ = the wavelength of the light forming said image,
$n$ = the order of the spatial harmonic,
$f$ = the focal length of the Fourier-transform lens,
$d$ = the step-and-repeat distance of the workpiece, to spatially modulate the light; and then reimaging the spatially modulated light to form an image exhibiting the non-periodic errors in the pattern, the discrete regions in said filter blocking essentially all periodic information in said image, and said at least one pair of compensating regions blocking the higher spatial frequencies corresponding to the edge information of the polygonal elements of the feature pattern.

3. The method according to claim 2 wherein at least one of said regions is positioned in coincidence with a location dictated by the equation:

$$x = f \tan [\sin^{+1} (n\lambda/d)]$$

where, $x$ = the distance of the $n^{th}$ region from the origin;
$\lambda$ = the wavelength of the light forming said image;
$n$ = the order of the spatial harmonic and is greater than one;
$d$ = the step-and-repeat distance of the workpiece; and
$f$ = the focal length of the Fourier-transform lens.

4. The method according to claim 3 wherein said point of coincidence lies approximately halfway between the centermost filter region and the corresponding one of said compensating regions.

5. A method of isolating non-periodic errors in a matrix-like array of nominally identical features, each feature comprising a pattern of lines and other polygonal elements, said features being mutually spaced apart by a predetermined distance, along at least one axis, which comprises the steps of:

directing a spatially coherent beam of light at the pattern to diffract the light;

focusing the diffracted light on a filter consisting of a matrix-like array of discrete substantially equally sized opaque regions on a transparent field and at least one pair of opaque compensating regions for each element edge orientation located symmetrically about and spaced from the center of the filter, on an axis orthogonal to the corresponding element edge, such that a substantial number of said substantially equally sized opaque regions are disposed between the individual regions of each pair of compensating regions the spacing of said substantially equally sized opaque regions, along at least one axis thereof, increases outwardly from the centermost region, according to the formula:

$$x = f \tan [\sin^{-1} (n\lambda/d) ]$$

where, $x$ = the distance of the $n^{th}$ region from the origin,
$\lambda$ = the wavelength of the light forming said image,
$n$ = the order of the spatial harmonic,
$d$ = the step-and-repeat distance of the workpiece,
$f$ = the focal length of the Fourier-transform lens,
to spatially modulate the light; and the reimaging the spatially modulated light to form an image exhibiting the non-periodic errors in the pattern, the discrete regions in said filter blocking essentially all periodic information in said image, and said at least one pair of compensating regions blocking the higher spatial frequencies corresponding to the edge information of said polygonal elements of the feature pattern.

6. Apparatus for inspecting non-periodic errors in a matrix-like array of nominally identical features, each feature comprising a pattern of lines and other polygonal elements, said features being mutually arranged in a planar periodic array, which comprises:

means for directing a spatially coherent beam of light at the plane of the pattern so that the light is diffracted thereby;

a first lens positioned to focus the light diffracted by the pattern;

a planar optical filter consisting of an array of discrete substantially equally sized opaque regions on a transparent field, and at least one pair of compensating regions for each element edge orientation located symmetrically about and spaced from the center of the filter, on an axis orthogonal to the corresponding feature edge, such that a substantial number of said substantially equally sized opaque regions are disposed between the individual regions of each pair of compensating regions the filter being positioned at the focal plane of the first lens for spatially modulating the intensity of the light focused thereon by the first lens;

a second lens positioned to reimage the light transmitted by the filter to form a visual image of the non-periodic errors in the pattern of the image-display means; and means for projecting the visual image onto the image-display means.

7. The apparatus according to claim 6 wherein the region-to-region spacing in said array, along at least one axis thereof, is given by the equation:

$$x = n\lambda f/d$$

where, $x$ = the distance of the $n^{th}$ region from the origin;
$\lambda$ = the wavelength of the light forming said image;
$n$ = the order of the spatial harmonic;

$d$ = the step-and-repeat distance of the workpiece; and $f$ = the focal length of the Fourier-transform lens.

8. The apparatus according to claim 6 wherein the region-to-region spacing in said array, along at least one axis thereof, is greater than the spacing dictated by the equation:

$$x = n\lambda f/d$$

where, $x$ = the distance of the $n^{th}$ region from the origin;

$\lambda$ = the wavelength of the light forming said image;

$n$ + the order of the spatial harmonic;

$d$ = the step-and-repeat distance of the workpiece; and $f$ = the focal length of the Fourier-transform lens.

9. The apparatus according to claim 8 wherein at least one of said regions is positioned in coincidence with a location dictated by the equation:

$$x = f \tan [\sin^{-1} (n\lambda/d)]$$

where, $x$ = the distance of the $n^{th}$ region from the origin;

$\lambda$ = the wavelength of the light forming said image;

$n$ = the order of the spatial harmonic and is greater than one;

$d$ = the step-and-repeat distance of the workpiece; and $f$ = the focal length of the Fourier-transform lens.

10. The apparatus according to claim 9 wherein said point of coincidence lies approximately halfway between the centermost filter region and the corresponding one of said compensating regions.

11. The apparatus according to claim 6 wherein the region-to-region spacing in said array, along at least one axis thereof, increases outwardly from the centermost region, according to the formula:

$$x = f \tan [\sin^{-1} (n\lambda/d)]$$

where, $x$ = the distance of the $n^{th}$ region from the origin;

$\lambda$ = the wavelength of the light forming said image;

$n$ = the order of the spatial harmonic;

$d$ = the step-and-repeat distance of the workpiece; and $f$ = the focal length of the Fourier-transform lens.

12. Apparatus according to claim 6 wherein said image-display means and said projecting means comprises:

a television camera focused on said visual image;

control means, connected to said camera, for supplying deflection signals and power to said camera, said camera scanning across said visual image to detect said non-periodic errors; and counting means, connected to the video output of said camera, for counting the number of non-periodic errors so detected.

13. A spatial filter for filtering the Fourier transform of the image of a workpiece, said workpiece comprising a matrix-like array of nominally identical features, containing polygonal elements, which consists of:

a matrix-like array of discrete substantially equally sized opaque regions on a transparent field, said regions inhibiting further transmission of substantially all periodic information in said transform; and at least one pair of opaque compensating regions for each element edge orientation, located symmetrically about the center of said filter, on an axis orthogonal to the corresponding element edge, such that a substantial number of said substantially equally sized opaque regions are disposed between the individual regions of each pair of compensating regions to inhibit further transmission of the higher spatial frequencies corresponding to the edge information of the polygonal elements of the feature pattern.

14. The spatial filter according to claim 13 wherein, the region-to-region spacing in said array, along at least one axis thereof, is given by the equation:

$$x = n\lambda\lambda f/d$$

where, $x$ = the distance of the $n^{th}$ region from the origin;

$\lambda$= the wavelength of the light forming said image;

$n$ = the order of the spatial harmonic;

$d$ = the step-and-repeat distance of the workpiece; and $f$ = the focal length of the Fourier-transform lens.

15. The spatial filter according to claim 13 wherein the region-to-region spacing in said array, along at least one axis thereof, is greater than the spacing distated by the equation:

$$x = n\lambda f/d$$

where, $x$ = the distance of the $n^{th}$ region from the origin;

$\lambda$ = the wavelength of the light forming said image;

$n$ = the order of the spatial harmonic;

$d$ = the step-and-repeat distance of the workpiece; and $f$ = the focal length of the Fourier-transform lens.

16. The spatial filter according to claim 15 wherein at least one of said regions is positioned in coincidence with a location dictated by the equation:

$$x = f \tan [\sin^{-1} (n\lambda/d)]$$

where, $x$ = the distance of the $n^{th}$ region from the origin;

$\lambda$ = the wavelength of the light forming said image;

$n$ = the order of the spatial harmonic and is greater than one;

$d$ = the step-and-repeat distance of the workpiece; and $f$ = the focal length of the Fourier-transform lens.

17. The spatial filter according to claim 16 wherein said point of coincidence lies approximately halfway between the centermost filter region and the corresponding one of said compensating regions.

18. The spatial filter according to claim 13 wherein the region-to-region spacing in said array, along at least one axis thereof, increases outwardly from the centermost region, according to the equation:

$$x = f \tan [\sin^{-1} (n\lambda/d)]$$

where, $x$ = the distance of the $n^{th}$ region from the origin;

$\lambda$ = the wavelength of the light forming said image;

$n$ = the order of the spatial harmonic;

$d$ = the step-and-repeat distance of the workpiece; and $f$ = the focal length of the Fourier-transform lens.

* * * * *

UNITED STATES PATENT OFFICE
CERTIFICATE OF CORRECTION

Patent No. 3,790,280 Dated February 5, 1974

Inventor(s) R. A. HEINZ-R. C. OEHRLE

It is certified that error appears in the above-identified patent and that said Letters Patent are hereby corrected as shown below:

In the specification, column 2, line 44, "certail" should read --certain--. Column 4, line 5, "begain" should read --begin--. Column 8, line 38, "even" should read --of even--. Column 12, line 6, "Picturephone" should read --Picturephone ®--.

In the claims, column 14, line 20, claim 5, "and the" should read --and then--. Column 15, line 13, claim 8, "n +" should read --n = --. Column 16, line 3, claim 13, "about the" should read --about and spaced from the--; line 15, claim 14, "$n\lambda\lambda f/d$" should read --$n\lambda f/d$--; line 26, claim 15, "distated" should read --dictated--.

Signed and sealed this 11th day of June 1974.

(SEAL)
Attest:

EDWARD M. FLETCHER, JR.
Attesting Officer

C. MARSHALL DANN
Commissioner of Patents